United States Patent [19]

Nakamura et al.

[11] Patent Number: 5,559,380
[45] Date of Patent: Sep. 24, 1996

[54] AIR-COOLED MOTOR

[75] Inventors: Kosei Nakamura; Yukio Katsuzawa; Yoshinobu Maeda, all of Yamanashi, Japan

[73] Assignee: Fanuc Ltd., Japan

[21] Appl. No.: 355,333

[22] Filed: Dec. 12, 1994

[30] Foreign Application Priority Data

Dec. 20, 1993 [JP] Japan ..................... 5-319965

[51] Int. Cl.$^6$ ..................... H02K 1/32
[52] U.S. Cl. ..................... 310/64; 310/62; 310/89; 310/254
[58] Field of Search ..................... 310/64, 58, 59, 310/52, 62, 89, 254

[56] References Cited

U.S. PATENT DOCUMENTS

| | | | |
|---|---|---|---|
| 3,009,072 | 11/1961 | Mossay | 310/64 |
| 3,531,668 | 9/1970 | Cathey | 310/58 |
| 4,015,155 | 3/1977 | Lang | 310/64 |
| 4,853,566 | 8/1989 | Dinkelmann | 310/59 |
| 5,124,600 | 6/1992 | Hedeen | 310/62 |

Primary Examiner—R. Skudy
Attorney, Agent, or Firm—Staas & Halsey

[57] ABSTRACT

An air-cooled motor having cooling-air passages each formed by a plurality of small ventilation passages extending through a front housing, a stator, and a rear housing, constructed in one piece. Cuttings are prevented from being accumulated at inlets of cooling-air passages. For example, the cooling-air passages are formed of ten small ventilation passages, each defined between adjacent ones of eleven ribs each forming part of the stator. All the eleven ribs are provided with respective front housing ribs. End faces of the front housing ribs on the cooling-air inlet side are uniform in height, and positioned in an identical plane. Cooling air flows into the small ventilation passages in the direction of an arrow. In this case, the end faces of the small ventilation passages on the cooling-air inlet side are aligned, so that cuttings contained in cooling air are accumulated only on the end faces of ribs defining the small ventilation passages on the cooling-air inlet side, forming accumulation layers thereon, which prevents the small ventilation passages from being clogged with accumulations of cuttings.

3 Claims, 4 Drawing Sheets

AIR-COOLED MOTOR

BACKGROUND OF THE INVENTION

1. Field of the Invention

This invention relates to an air-cooled motor having cooling-air passages formed through a front housing, a stator, and a rear housing, which are constructed in one piece, the cooling-air passages each being formed by a plurality of small ventilation passages.

2. Description of the Related Art

Conventionally, an air-cooled motor is known, which includes a stator, and a front housing and a rear housing provided on opposite sides of the stator, all constructed in one piece, with the front housing, the stator, and the rear housing being formed with cooling-air passages which extend therethrough and are each formed by a plurality of small ventilation passages. The construction of cooling-air passages of an air-cooled motor of this type will be described below with reference to FIG. 5 and FIG. 6.

FIG. 5 (PRIOR ART) shows a front of a conventional air-cooled motor. In the figure, reference numeral 50 designates a front housing provided on a front side of the air-cooled motor, which is followed on the reverse side of the figure by a stator and a rear housing, not shown in this figure, which are constructed in one piece with the front housing 50. The front housing 50 has a fixture flange 51 formed on a front side thereof, which provides a motor-fixing end face via which the motor is fixed to a partner machine to be associated therewith. The fixture flange 51 is constructed such that an annular projection 52 thereof fits into a fitting opening of the partner machine. The annular projection 52 includes a large number of radial ribs 52a, as shown in the figure, for reinforcement thereof. Further, the fixture flange 51 has bolt holes 53 formed therethrough at four corners thereof for bolting the motor to the partner machine. A shaft 600 extending from the center of the stator projects out of the front end face of the motor, and a shaft cover 54 is provided such that it surrounds the shaft 600, and closes space between the shaft 600 and the annular projection 52.

The front housing 50 has cooling-air inlet ports 55 formed therein by cutting out four corners thereof, respectively. Front and rear walls defining the cooling-air inlet 55 ports are formed by the fixture flange 51 of the front housing 50 and a joining flange 57 forming a joint with the stator, respectively. Each of the cooling-air inlet ports 55 is connected to a cooling-air passage 56. The cooling-air passage 56 is provided for cooling the stator by cooling air caused to flow therethrough, and extends through the joining flange 57 of the front housing 50, the stator, and the rear housing. The construction of the cooling-air passage 56 will be described with reference to FIG. 6.

FIG. 6 (PRIOR ART) is a cross-sectional view taken on line B—B of FIG. 5. In the figure, the cooling-air passage 56 is formed by a plurality of (six, in this example) small ventilation passages 56a. Each of the small ventilation passages 56a is defined between adjacent ones of seven ribs 611, 612, 613, 614, 615, 616, and 617, each rib forming part of the stator. The ribs 611 and so forth are formed by a laminate 62 of rib-shaped portions of flat rolled magnetic steel sheets. Out of the seven ribs 611 and so forth, alternate ones 611, 613, 615, and 617 are additionally formed with front housing ribs 501, 502, 503, and 504 on the cooling-air inlet side thereof, so that the cooling-air passage 56 has three wide inlets 56b on the cooling-air inlet side, each of which is bifurcated into two narrow inlets 56c each formed by a small ventilation passage 56a. The front housing ribs 501 and so forth each form a part of the joining flange 57.

In the cooling-air passage 56 constructed as above, cooling air flows into the wide inlets 56b in the direction of an arrow 80, and then into the narrow inlets 56c bifurcated from each of the wide inlets 56b, followed by flowing through the stator.

In the case of the cooling-air passage 56 constructed as above, the narrow inlets 56c are not identical in position or height with the wide inlets 56b. Therefore, if cuttings are contained in the cooling air, the cuttings are liable to be caught by stepped shoulders 56d which divide the wide inlets 56b into the narrow inlets 56c, and are gradually accumulated thereon. As a result, there are formed layers 70 of accumulated cuttings which would eventually clog the small ventilation passages 56a. When a small ventilation passage 56a is clogged with a layer 70 of accumulated cuttings, cooling air cannot flow therethrough any longer, which results in a lowered cooling capability of the cooling-air passage 56.

SUMMARY OF THE INVENTION

The present invention has been made in view of these circumstances, and the object thereof is to provide an air-cooled motor which is capable of preventing cuttings from being accumulated at inlets of cooling-air passages thereof.

To attain the above object, there is provided an air-cooled motor including a stator, and a front housing and a rear housing provided on respective sides of the stator, all constructed in one piece, with the front housing, the stator, and the rear housing being formed with cooling-air passages extending therethrough and each formed by a plurality of small ventilation passages, wherein the plurality of small ventilation passages have end faces on cooling-air inlet sides thereof aligned to each other.

In the cooling-air passages, the end faces of the plurality of small ventilation passages on the cooling-air inlet side are aligned in height, stepped shoulders conventionally formed therein are eliminated. Therefore, cuttings are not accumulated in such a manner as will eventually clog the small ventilation passages but only on end faces of walls defining them.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

The invention will now be described in detail with reference to drawings showing an embodiment of the invention.

Figure 2:
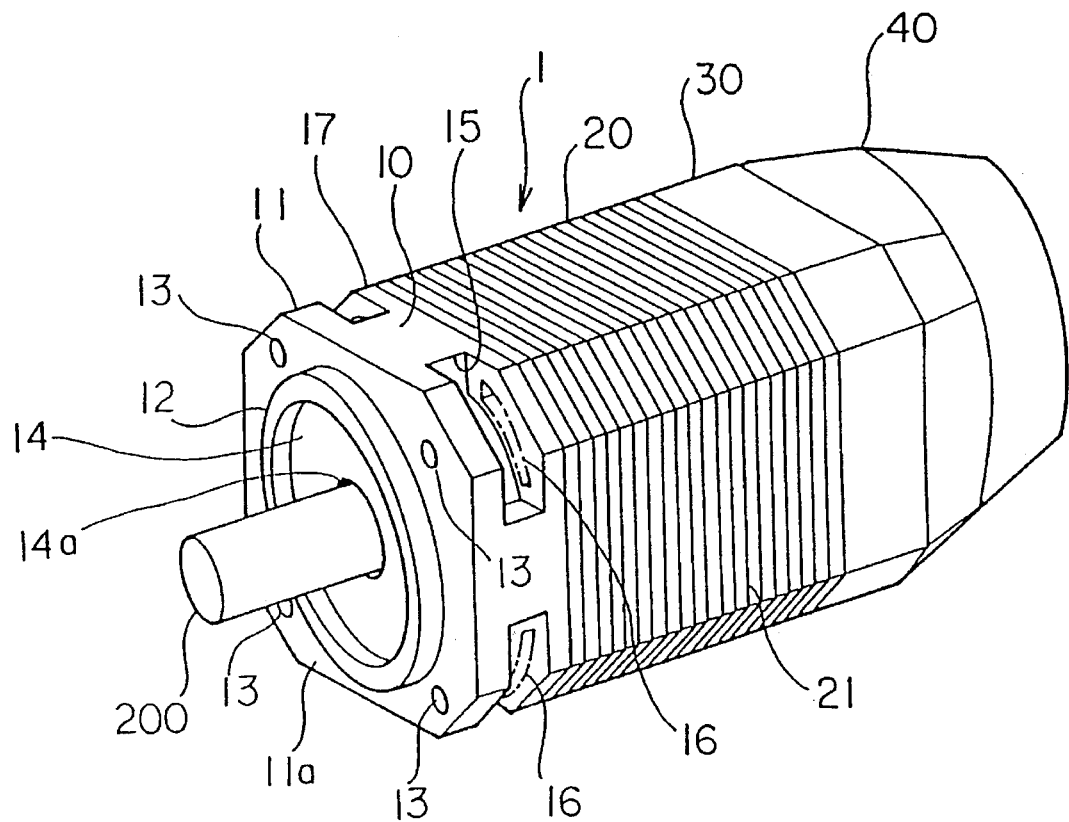
FIG. 2 is a perspective view of an induction motor according to an embodiment of the invention.
Figure 3:
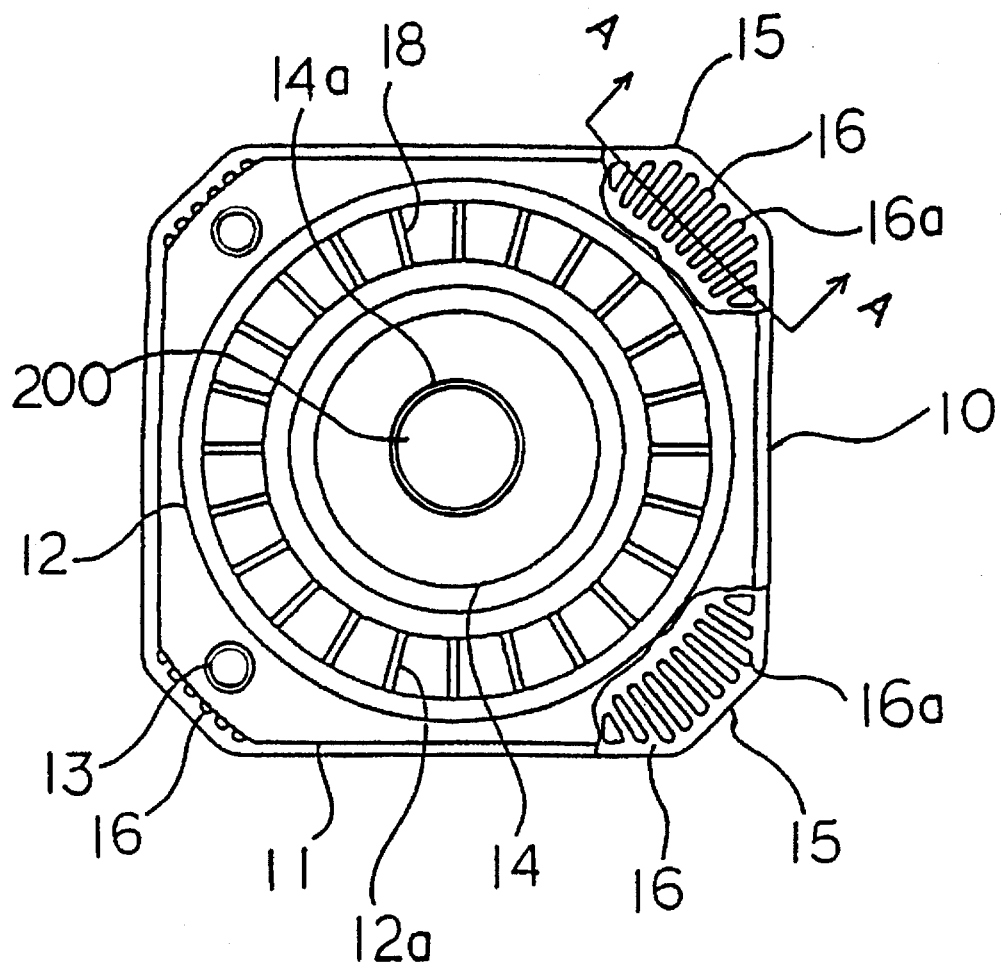
FIG. 3 is a diagram showing a front of the induction motor.

FIG. 2 is a perspective view of an induction motor according to an embodiment of the invention, and FIG. 3 shows a front thereof. In these figures, the induction motor 1 mainly comprises a front housing 10, a stator 20, a rear housing 30, and a fan cover 40. The stator 20 is arranged such that the stator 20 itself forms a peripheral housing of the motor, and has the front housing 10 and the rear housing 30 assembled thereto on the front and rear sides thereof, respectively, whereby the interior of the motor is airtightly enclosed in these housings.

The front housing 10 has a fixture flange 11 formed on a front side thereof, via which the motor is fixed to a partner machine, not shown. On a front end face 11a of the fixture flange 11, an annular projection 12 is formed for being fit in a fitting opening of the partner machine. The annular projection 12 includes a large number of radial ribs 12a, as shown in FIG. 3, for reinforcement thereof. Further, the fixture flange 11 has bolt holes 13 formed therethrough at four corners thereof for bolting the motor to the partner machine. A shaft cover 14 is attached to the inside of the annular projection 12, and a shaft 200 of a rotor, not shown, projects out of a central hole 14a formed through the shaft cover 14.

The front housing 10 has cooling-air inlet ports 15 formed therein by cutting four corners thereof, respectively. Front and rear walls defining the cooling-air inlet ports 15 are formed by the fixture flange 11 of the front housing 10 and a joining flange 17 forming a joint with the stator 20, respectively. Each of the cooling-air inlet ports 15 is connected to a cooling-air passage 16. The cooling-air passage 16 is provided for cooling the interior of the induction motor 1 by cooling air caused to flow therethrough, and extends through the joining flange 17 of the front housing 10, the stator 20, and the rear housing 30. As described above, the induction motor 1 according to the present embodiment is an air-cooled type. The details of construction of the cooling-air passage 16 will be described later.

The stator 20 is formed by laminating a large number of flat rolled magnetic steel sheets 21. Each of the flat rolled magnetic steel sheets 21 has ventilating holes, not shown, formed therethrough in a manner corresponding to the respective air-cooling passages 16 described above. When the flat rolled magnetic steel sheets 21 are laminated, there are formed the cooling-air passages 16 extending through the stator 20.

A fan cover 40 is provided on the rear of the rear housing 30, for covering a fan 41 (see FIG. 4) received therein for protection of same. Flows of cooling air produced by the fan 41 will be described below.

Figure 4:
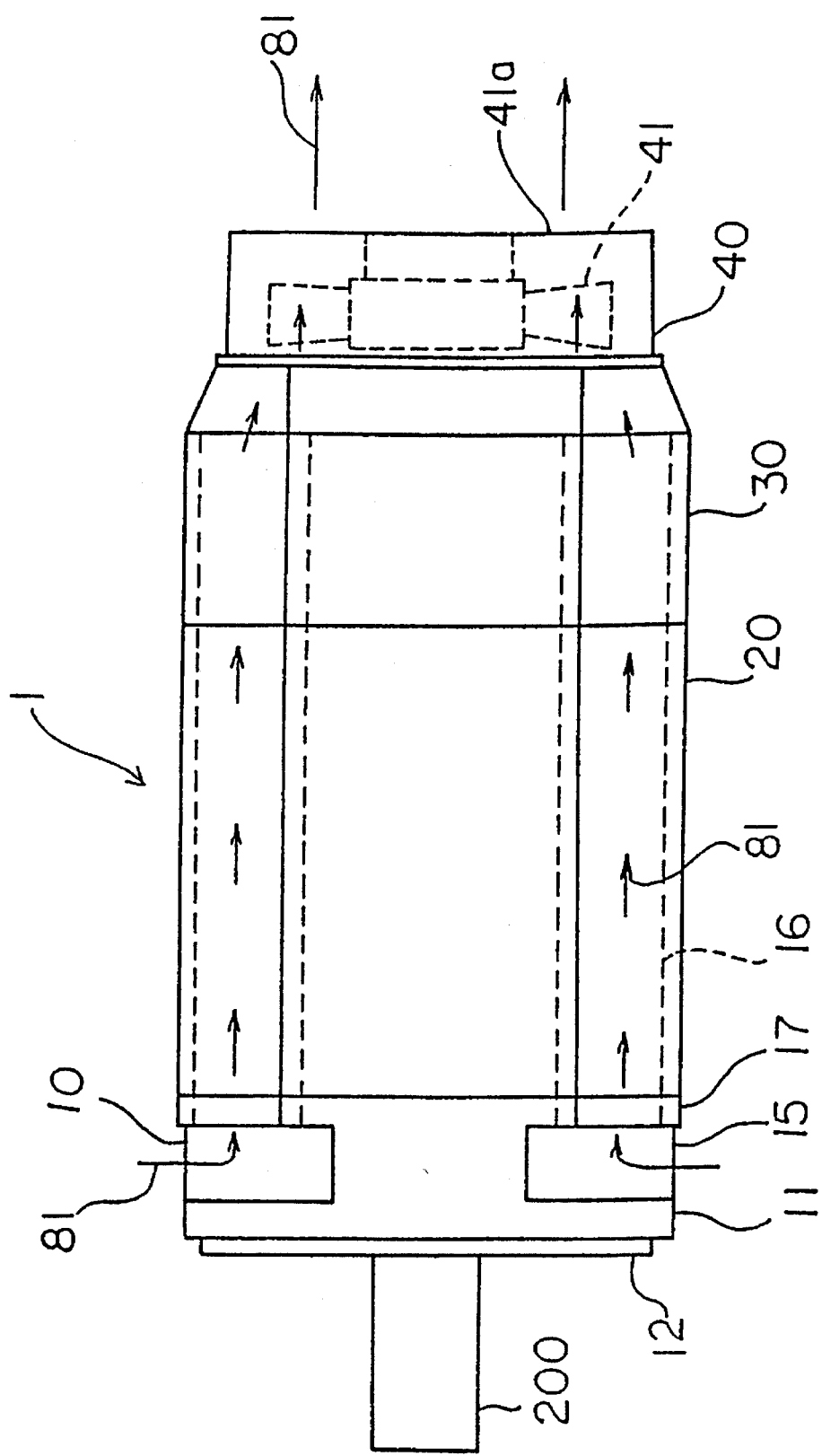
FIG. 4 is a diagram which is useful in explaining flows of cooling air flowing through cooling-air passages.
Figure 5:
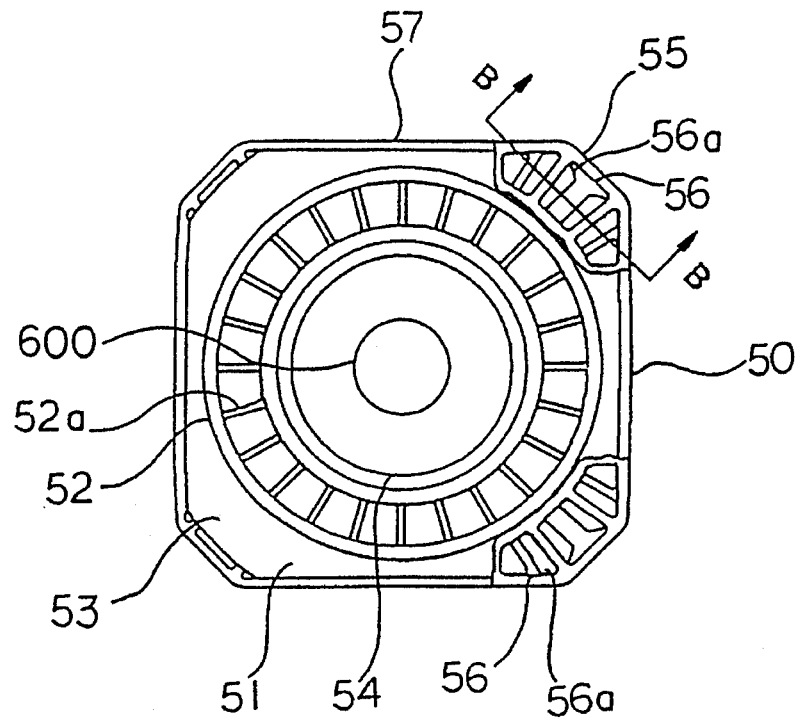
FIG. 5 (PRIOR ART) is a diagram showing a front of a conventional air-cooled motor.
Figure 6:
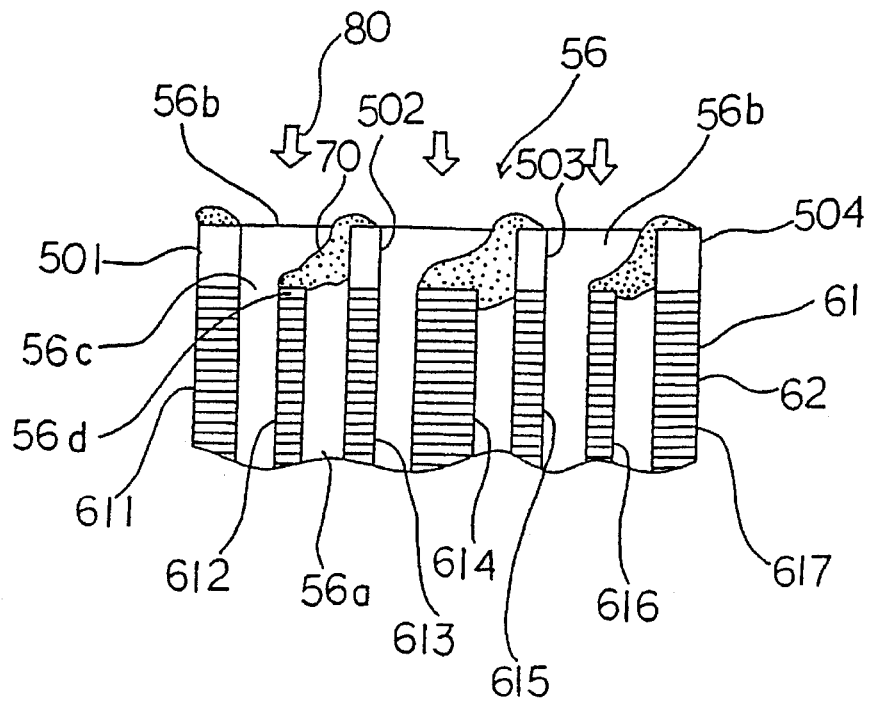
FIG. 6 (PRIOR ART) is a cross-sectional view taken on line B—B of FIG. 5.

FIG. 4 shows the cooling-air passages and flows of cooling air flowing therethrough. FIG. 4 is a plan view of the motor shown in FIG. 2. In the figure, when the fan 41 received under the fan cover 40 is driven for rotation, the cooling air is drawn into the cooling-air passages via the cooling air inlet ports 15. Then, the cooling air flows, as indicated by arrows 81 in the figure, through the cooling-air passages 16 extending through the joining flange 17 of the front housing 10, the stator 20, and the rear housing 30, while absorbing heat generated within the induction motor 1, followed by being discharged via an opening formed in rear portions 41a of the fan cover 40.

Next, the construction of the inlet side of the cooling-air passage 16 will be described with reference to FIG. 1.

Figure 1:
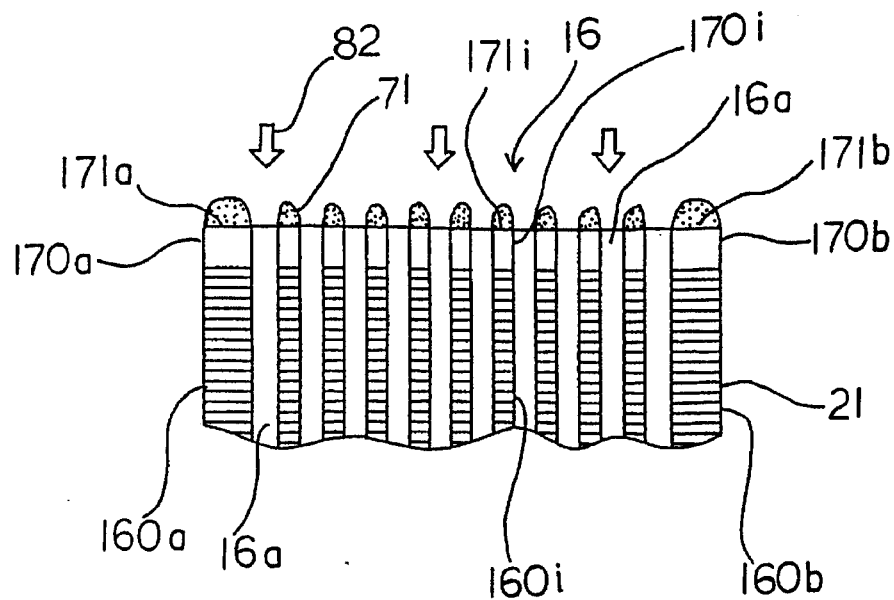
FIG. 1 is a diagram showing the construction of an inlet side of a cooling-air passage.

FIG. 1 is a cross-sectional view taken on line A—A of FIG. 3, and shows the construction of the inlet side of one of the cooling-air passages 16. As shown in the figure, the cooling-air passage 16 comprises a plurality of (ten, in this embodiment) small ventilation passages 16a. Each of the small ventilation passages 16a is defined by adjacent ones of eleven ribs 160a, 160i (i=1 to 9), and 160b, each forming part of the stator 20. The ribs 160a, 160i, and 160b are formed by a laminate of rib-shaped portions of flat rolled magnetic steel sheets. The ribs 160a and 160b correspond to the outer peripheral portions of the stator 20.

All the eleven ribs 160a and so forth are provided with the front housing ribs 170a, 170i (i=1 to 9), and 170b on the cooling air inlet side thereof. The front housing ribs 170a and so forth form part of the joining flange 17, and the front housing ribs 170a and 170b correspond to the outer peripheral portions of the front housing 10. The front housing ribs 170a, 170i, and 170b have end faces 171a, 171i, and 171b on the cooling-air inlet side which are aligned in height, and located on an identical plane.

In the cooling-air passage 16 having the construction described above, cooling air flows into the small ventilation passages 16a in the direction of an arrow 82. In this case, the end faces 171a, 171i and 171b of the housing ribs 170a, 170i, and 170b defining the small ventilation passages 16a of the cooling-air passage 16 on the cooling-air inlet sides thereof are aligned in height, so that stepped shoulders conventionally provided in the cooling-air passage 16 are eliminated. Therefore, even if cuttings are contained in the cooling air, they are only accumulated on the end faces 171a, 171i, and 171b on the cooling-air inlet side, forming layers 71 of accumulated cuttings thereon. Therefore, the small ventilation passages 16a cannot be clogged with the cuttings accumulated at the inlets of cooling air, and hence the cooling capability of the cooling-air passage cannot be lowered.

Further, the cuttings are not accumulated in such a manner that they clog the small ventilation passages 16a, and hence the distance between adjacent ones of the small ventilation passages 16a can be reduced. Therefore, it is possible to provide a larger number of small ventilation passages 16a, thereby securing the higher cooling capability of the cooling-air passage.

As described heretofore, according to the present invention, end faces of the small ventilation passages forming the cooling-air passages on the cooling air inlet sides are aligned in height, whereby even if cuttings are contained in cooling air, the cuttings are only accumulated on the end faces of walls or a laminate of ribs defining the small ventilation passages on the cooling-air inlet sides. Therefore, it is possible to prevent the small ventilation passages from being clogged with accumulations of cuttings.

Further, it is possible to prevent lowering of the cooling capability of the cooling-air passages caused by clogging of the small ventilation passages thereof with cuttings.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An air-cooled motor comprising: a stator, a front housing and a rear housing provided on opposite sides of said stator, said stator, said front housing and said rear housing constructed in one piece, cooling-air passages formed in said front housing, said stator and said rear housing and extending therethrough, and each of said cooling-air passages formed by a plurality of small ventilation passages each having end faces on cooling-air inlet sides thereof which are aligned with each other.

2. An air-cooled motor according to claim 1, wherein said end faces of said small ventilation passages correspond to end faces of ribs of said front housing connected to ribs of said stator.

3. An air-cooled motor according to claim 1, further comprising a cooling fan which draws cooling air into said cooling-air passages and is provided on said rear housing.

* * * * *